US008095299B2

(12) United States Patent
Martin et al.

(10) Patent No.: US 8,095,299 B2
(45) Date of Patent: Jan. 10, 2012

(54) METHOD FOR STARTING A VEHICLE ENGINE

(75) Inventors: Douglas Raymond Martin, Canton, MI (US); Khang Thanh Hong, Novi, MI (US); William David Treharne, Ypsilanti, MI (US); Tobias John Pallett, Farmington, MI (US); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 12/429,324

(22) Filed: Apr. 24, 2009

(65) Prior Publication Data

US 2010/0211298 A1     Aug. 19, 2010

Related U.S. Application Data

(60) Provisional application No. 61/152,661, filed on Feb. 13, 2009.

(51) Int. Cl.
  *G06F 19/00*     (2011.01)
  *F02D 41/06*     (2006.01)
  *F02M 1/00*      (2006.01)
  *F02N 11/00*     (2006.01)

(52) U.S. Cl. .............. 701/113; 123/179.4; 123/179.18

(58) Field of Classification Search .............. 123/179.3, 123/179.4, 179.16, 179.18, 396, 399, 403; 701/101–103, 113
See application file for complete search history.

(56) References Cited

U.S. PATENT DOCUMENTS

| 5,274,559 | A | * | 12/1993 | Takahashi et al. ............ 701/103 |
| 5,657,730 | A | * | 8/1997 | Gustavsson .............. 123/179.16 |
| 6,467,458 | B1 | | 10/2002 | Suzuki et al. |
| 6,588,400 | B2 | | 7/2003 | Gyoergy et al. |
| 6,679,225 | B2 | | 1/2004 | Robertson et al. |
| 6,971,357 | B2 | | 12/2005 | Grieser et al. |
| 7,503,301 | B2 | * | 3/2009 | Trask et al. ............... 123/179.18 |

FOREIGN PATENT DOCUMENTS

| JP | 63-105254 | | 5/1988 | |
| JP | 5-321714 | | 12/1993 | |
| JP | 2003-214221 | A | 7/2003 | |
| JP | 2005-273629 | A | 10/2005 | |
| JP | 2009002314 | A * | 1/2009 | ............... 123/179.16 |

* cited by examiner

*Primary Examiner* — Willis Wolfe, Jr.
(74) *Attorney, Agent, or Firm* — David Kelley; Brooks Kushman P.C.

(57) ABSTRACT

A method for starting a vehicle engine includes determining a throttle angle command output based on a throttle adjustment parameter. The throttle angle command output may be further adjusted based on a learned compensation adder and may be based on a number of vehicle engine starts. A throttle angle corresponding to the throttle angle command output is provided.

18 Claims, 4 Drawing Sheets

METHOD FOR STARTING A VEHICLE ENGINE

CROSS-REFERENCE TO RELATED APPLICATIONS

This application claims the benefit of U.S. provisional application Ser. No. 61/152,661 filed Feb. 13, 2009, which is hereby incorporated herein by reference.

BACKGROUND

1. Technical Field

The multiple embodiments disclosed herein relate to a method for controlling engine start in a vehicle.

2. Background Art

Hybrid electric vehicles (HEV's) utilize a combination of an internal combustion engine with an electric motor to provide the power needed to propel a vehicle. This arrangement provides improved fuel economy over a vehicle that has only an internal combustion engine. One method of improving the fuel economy in an HEV is to shutdown the engine during times that the engine operates inefficiently, and is not otherwise needed to propel the vehicle. In these situations, the electric motor is used to provide all of the power needed to propel the vehicle. When the driver power demand increases such that the electric motor can no longer provide enough power to meet the demand, or if the battery state of charge drops below a certain level, the engine must start quickly and smoothly in a manner that is nearly transparent to the driver.

Starting an engine in an HEV can occur when the vehicle is operating under any one of a number of different conditions. One such operating condition includes starting the engine in an HEV when it is moving under the power of the electric motor. Control of the engine start may be different for different sets of conditions under which the vehicle is operating.

Aging and other factors may cause the engine to fail to start on the first attempt. Among these factors are poor fuel quality, spark plug fouling, and reduced airflow through the intake system due to throttle sludging. By simply attempting a re-start of the engine under the same actuator command settings, these factors may not be overcome, resulting in multiple failed starts and the vehicle entering a non-functional state.

While the aforementioned description is focused on an HEV application, the authors recognize that the disclosed strategies can be applied to a conventional (non-HEV) engine start.

SUMMARY

In one embodiment, a method for starting a vehicle engine is disclosed. A throttle angle command output is determined based on a predetermined throttle adjustment parameter. The throttle angle command output is adjusted based on a compensation factor. A throttle angle is provided corresponding to the throttle angle command output to start the vehicle engine.

In one embodiment, the compensation factor is at least one of an adder and a multiplier.

In a further embodiment, the compensation factor is adjusted based on a compensation multiplier.

In another embodiment, the compensation factor is calculated based on a previous airflow measurement.

In yet another embodiment the compensation factor is stored as a learned compensation factor.

In a further embodiment, a predetermined compensation factor is provided as the compensation factor.

In another embodiment, an ignition attempt number is determined by counting the number of vehicle engine start attempts before an ignition reset or successful engine start.

In a further embodiment, the compensation factor is adjusted based on the ignition attempt number such that the throttle angle is modified as the ignition attempt number increases.

In a further embodiment, a catalyst temperature is determined. The throttle angle command output is further adjusted based on the catalyst temperature and the ignition attempt number.

In another embodiment, an electric machine is connected with the vehicle engine.

In yet another embodiment, the predetermined throttle adjustment parameter is at least one of airflow command input, barometric pressure, accelerator pedal position and engine coolant temperature.

In a further embodiment, an engine start is requested at a non-zero vehicle speed.

In another embodiment, a method for starting a vehicle engine is provided. A throttle angle command output is determined based on at least one of airflow command input, barometric pressure, accelerator pedal position and engine coolant temperature. An ignition attempt number is determined by counting the number of vehicle engine start attempts before an ignition reset or successful engine start. The throttle angle is adjusted based on the ignition attempt number. A throttle angle is provided corresponding to the throttle angle command output to start the vehicle engine.

In a further embodiment, the throttle angle is adjusted based on the ignition attempt number includes increasing the throttle angle command as the ignition attempt number increases.

In a further embodiment, a catalyst temperature is determined. The throttle angle command output is further adjusted based on the catalyst temperature and the ignition attempt number.

In a further embodiment, the throttle angle command output is further adjusted based on a predetermined adder. A calculated compensation factor is calculated based on a previous airflow measurement. The calculated compensation factor is stored as a learned compensation factor.

In yet another embodiment, a method for starting a vehicle engine is disclosed. A throttle angle command output is determined based on at least one of airflow command input, barometric pressure, accelerator pedal position and engine coolant temperature. An ignition attempt number is determined by counting the number of vehicle engine start attempts before an ignition reset or successful engine start. The throttle angle command output is adjusted based on the ignition attempt number such that a throttle angle is increased as the ignition attempt number increases. The throttle angle is provided corresponding to the throttle angle command output.

In a further embodiment, a catalyst temperature is determined. The throttle angle command output is further adjusted based on the catalyst temperature and the ignition attempt number.

In a further embodiment, the throttle angle command output is further adjusted based on an adder.

In a further embodiment, a new adder is calculating based on a previous airflow measurement. The new adder is stored as the adder.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
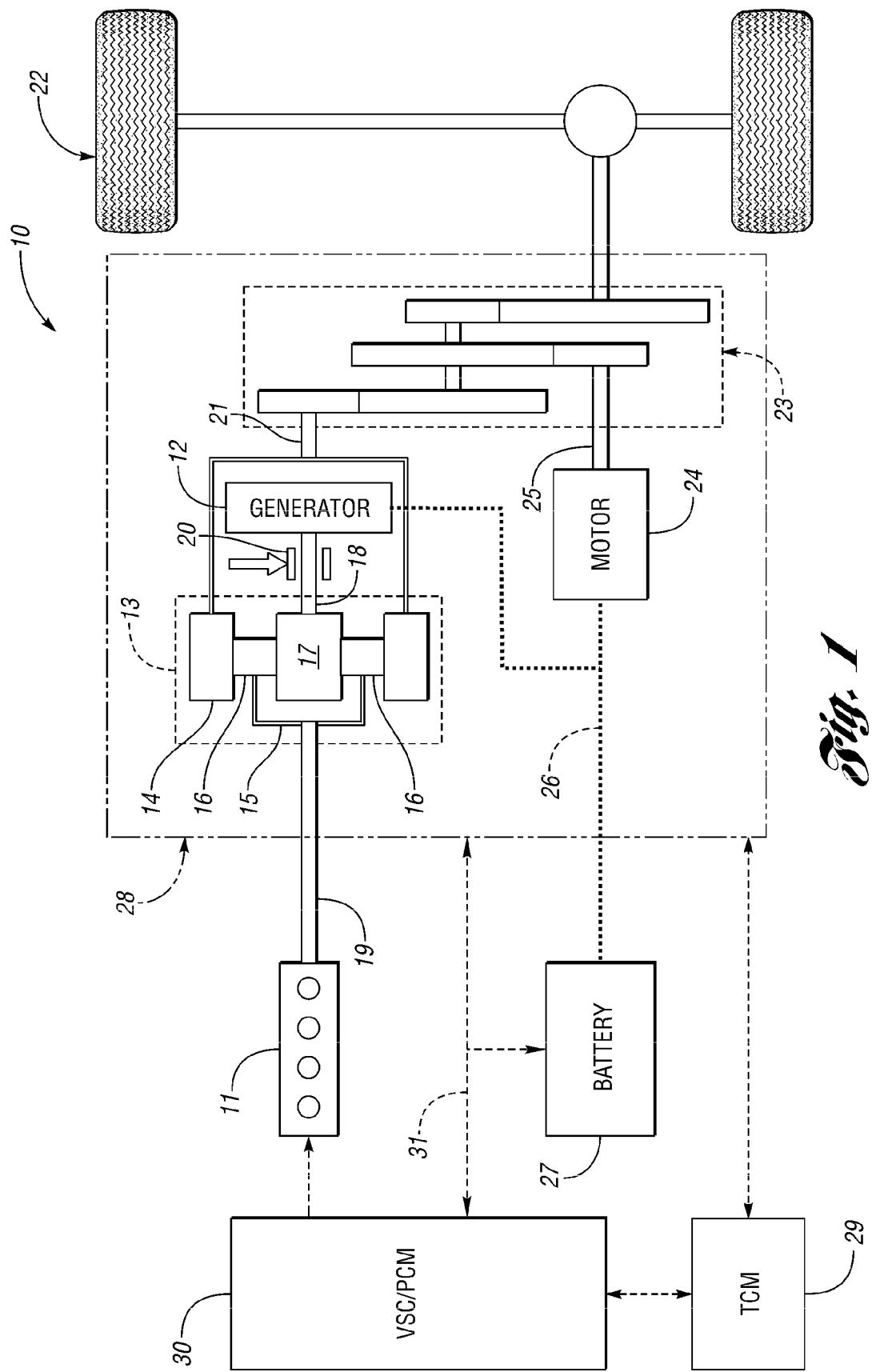
FIG. 1 is a schematic diagram of a vehicle in accordance with at least one embodiment of the present invention.

FIG. 1 shows a schematic diagram of a vehicle 10 in accordance with at least one embodiment of the present invention. The vehicle 10 is an HEV. Although the vehicle 10 is illustrated as an HEV, the multiple embodiments disclosed herein may be employed on a vehicle having only an internal combustion engine.

As illustrated, the vehicle 10 includes an engine 11 and an electric machine, or generator 12. The engine 11 and the generator 12 are connected through a power transfer unit, which in this embodiment is a planetary gear set 13. Of course, other types of power transfer units, including other gear sets and transmissions, may be used to connect the engine 11 to the generator 12. The planetary gear set 13 includes a ring gear 14, a carrier 15, planet gears 16, and a sun gear 17. In other embodiments, however, the vehicle 10 may include a powertrain with any one of several suitable configurations. For example, the vehicle 10 may be exclusively powered by an internal combustion engine, etc.

The generator 12 may be used as a motor, outputting torque to a shaft 18 connected to the sun gear 17. Similarly, the engine 11 may output torque to a shaft 19 connected to the carrier 15. A brake 20 is provided for stopping rotation of the shaft 18, thereby locking the sun gear 17 in place.

The ring gear 14 is connected to a shaft 21, which is connected to vehicle drive wheels 22 through a second gear set 23. The vehicle 10 may include a second electric machine, or motor 24, which may be used to output torque to a shaft 25. Other vehicles, however, may have different electric machine arrangements, such as a greater or fewer number of electric machines. In the embodiment of FIG. 1, the motor 24 and the generator 12 may both be used as motors to output torque. Alternatively, each may be used as a generator, outputting electrical power to a high voltage bus 26 and to an energy storage device, or battery 27.

The battery 27 of FIG. 1 is a high voltage battery that is capable of outputting electrical power to operate the motor 24 and the generator 12 when the generator acts as a motor. Other types of energy storage devices and/or energy output devices may also be used with the vehicle 10. For example, a capacitor may be used, which, like a high voltage battery, is capable of both storing and outputting electrical energy. Alternatively, a fuel cell may be used in conjunction with a battery and/or capacitor to provide electrical power for the vehicle 10.

The motor 24, the generator 12, the planetary gear set 13 and a portion of the second gear set 23 may generally be referred to as a transaxle 28. A controller, or transaxle control module (TCM) 29, controls the components of the transaxle 28, e.g., the generator 12 and motor 24. In addition to the TCM 29, the vehicle 10 may also include a second controller, which, in the embodiment of FIG. 1, is a combination vehicle system controller and powertrain control module (VSC/PCM) 30. The VSC/PCM 30 communicates with the TCM 29 and the engine 11, and also communicates with the transaxle 28 and the battery 27 through a controller area network (CAN) 31. Although the VSC/PCM 30 is shown as a single, integrated controller, the VSC and PCM may be contained in separate controllers. In addition, other controllers, such as the TCM 29, could be integrated into the VSC/PCM 30, so that the functions of each of the controllers shown in FIG. 1 were carried out by a single hardware device.

The various devices controlled by the VSC/PCM 30 may include their own controllers. For example, an engine control unit (ECU) may communicate with the VSC/PCM 30 and may perform control functions on the engine 11. This ECU may determine engine airflow, spark advance and desired air/fuel ratio needed to achieve a commanded or desired torque target. As known to those of ordinary skill, the desired air/fuel ratio may be determined by various powertrain system requirements which may include cold starting, cold start emissions, warm engine operation, etc. During cold engine operation, however, the actual air/fuel ratio may vary based on fuel volatility.

The battery 27 may have a battery control module (BCM) that sends and receives signals to and from the VSC/PCM 30 and the battery 27. The transaxle 28 may also include one or more controllers configured to control specific components within the transaxle 28, such as the generator 12 and/or the motor 24. Such controllers may communicate with both the TCM 29 and the VSC/PCM 30 via the CAN 31.

As discussed above, the generator 12 is configured to control the speed of the engine 11, i.e., the engine 11 is operated in a speed control mode. As the engine 11 operates, its speed may be monitored by one or more speed sensors (not shown), such that the generator 12 may provide positive or negative torque through the planetary gear set 13 to maintain the speed of the engine 11 approximately constant. The relationship between the generator 12 and the engine 11 provides a mechanism for adjusting the amount of fuel to the engine 11.

As the vehicle 10 is operated, a number of inputs, including driver inputs, may be received, for example, by the VSC/PCM 30 (or any other suitable controller(s)). As an example, an accelerator pedal position and/or a brake pedal position may be monitored in a known fashion, and signals sent to the VSC/PCM 30 to determine desired vehicle outputs. As another example, energy produced or stored by the generator 14 may be monitored in a known fashion, e.g., via a current sensor, and signals sent to the VSC/PCM 30 to determine a measured brake torque output by the engine 11. A mapping of generator current versus engine brake torque stored in the VSC/PCM 30, for example, may be used in such a determination. Alternatively, a strain associated with a crankshaft of the engine 11 may be monitored in a known fashion, e.g., a strain gauge, and signals sent to the VSC/PCM 30 to determine a measured brake torque output by the engine 11. A mapping of crankshaft strain versus engine brake torque stored in the VSC/PCM 30, for example, may be used in such a determination. (These mappings may be generated via testing under laboratory conditions and/or computer simulation.)

Of course, any suitable technique may be used to measure the brake torque output by the engine 11. As yet another example, mass air and mass fuel to the engine 11 may be monitored in a known fashion, e.g., via sensors, and signals sent to the VSC/PCM 30 to determine an expected brake torque output by the engine 11.

As known to those of ordinary skill, the mass air flow to the engine 11 may be measured directly with an airflow sensor or calculated from other sensor measurements; other engine operating parameters, such as spark advance and commanded air fuel/ratio are, of course, also available to the VSC/PCM 30 because they may be required for basic control of the engine 11. The VSC/PCM 30 (or any other suitable controller(s)) may thus determine the expected brake and indicated torque output by the engine 11 based on, for example, a mapping of the mass air flow, spark advance and commanded air/fuel ratio versus engine speed. This mapping may, for example, be generated via testing and/or computer simulations. Any suitable engine operating parameters, however, may be used.

The VSC/PCM 30 may break down the desired vehicle output into device-specific signals that may be used to command the various devices and/or communicate with other controllers. For example, based on the desired vehicle output torque, the VSC/PCM 30 may calculate a desired engine torque, which may be sent directly to the engine 11, or to an intermediate controller, such as an ECU. Similarly, the VSC/PCM 30, based at least in part on the driver inputs, may calculate a desired engine speed, and may communicate it to the TCM 29. The TCM 29 may then provide a command to the generator 12 to control the speed of the engine 11.

It is known to start an internal combustion engine by the triggering of combustion in an engine at rest. This is possible in internal combustion engines with spark ignition and direct ignition. An electronic throttle body (ETB) is used to regulate delivery of fuel, air or air/fuel mixture. Often, the ETB has a throttle angle that ranges between zero degrees, which is completely closed and approximately seventy two degrees, which is open. When the ETB is positioned at a proper throttle angle, the proper amount of air is moved into a combustion chamber as fuel is injected directly into the combustion chamber and is ignited by a spark. The subsequent combustion of the air/fuel mixture moves a piston and starts the engine rotating without a crankshaft having to be rotated by a starter device.

When the engine fails to start on a start attempt, rather than simply re-attempt to start the engine with the same actuator command settings, the throttle angle can be modified to increase the chances of a successful start. In particular, on each subsequent re-start attempt, the throttle angle can be opened to a larger position, until a position, which is deemed the maximum, is achieved. This provides more air to make more torque throughout the start. Furthermore, the required throttle angle increase for engine operation can be learned and stored permanently, allowing the optimum adjustment to be used on all subsequent starts. Thus, a re-start would not be required since the learned adjustment would give a successful start attempt on the first attempt.

Figure 2:
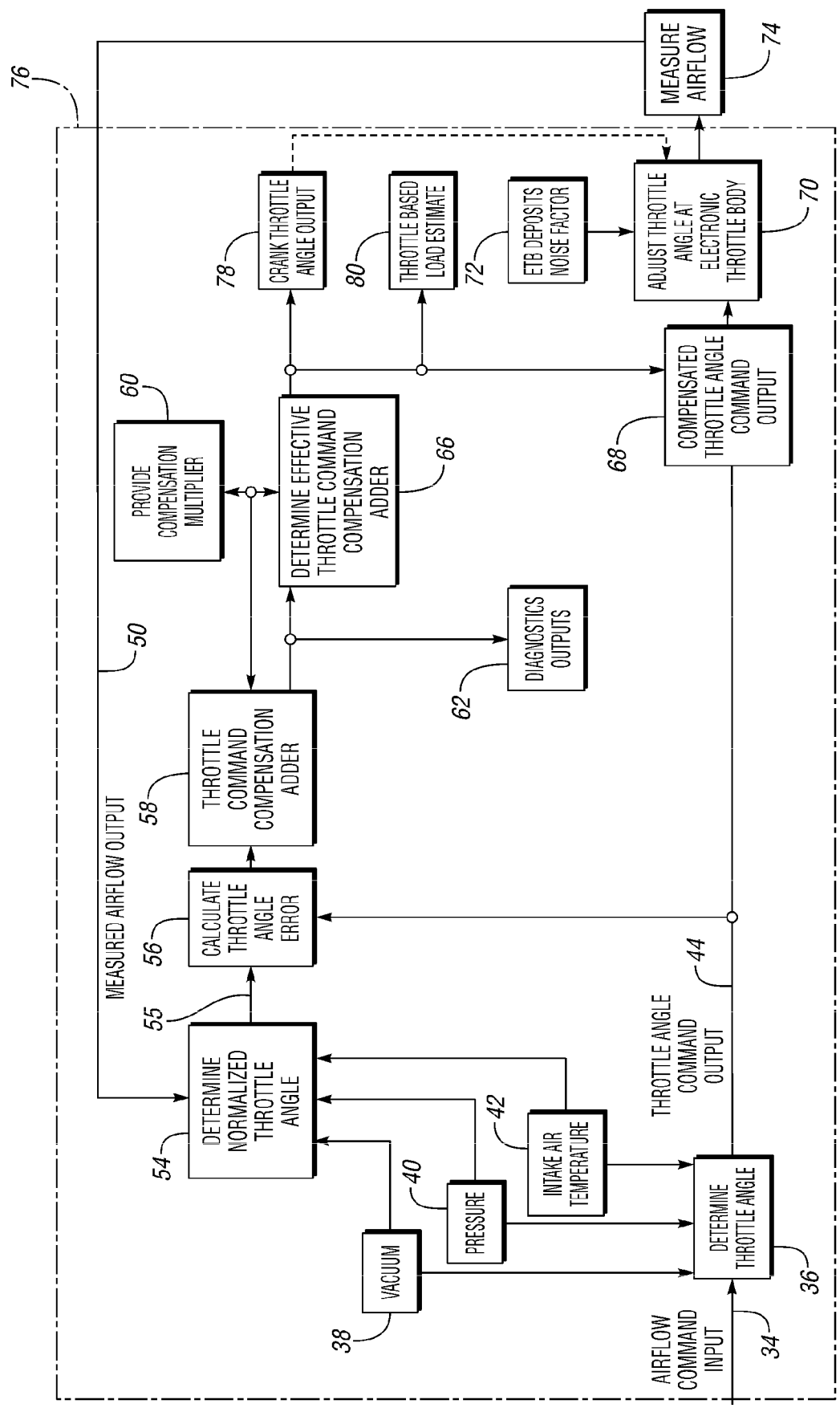
FIG. 2 is a flowchart illustrating a method for starting a vehicle engine in accordance with at least one embodiment of the present invention.

With reference to FIG. 2, a flowchart is illustrated to show an embodiment of a method of controlling airflow into a vehicle engine. In one embodiment, the method is employed on a vehicle having an engine that is connected to an electric machine or M/G, as illustrated in FIG. 1. In another embodiment, the method is employed on a vehicle having only an internal combustion engine.

To start the vehicle engine, a throttle adjustment parameter such as an airflow command input 34 is provided in order to determine an uncompensated throttle angle in step 36. The airflow command input 34 may be determined by a driver pressing on a pedal or actuating an ignition key. A vacuum measurement 38, a barometric pressure measurement 40 and an intake air temperature measurement 42 are also provided, as known in the art, to determine the uncompensated throttle angle in step 36 as the uncompensated throttle angle command output 44. The vacuum measurement 38 may be made within a manifold of the engine. The barometric pressure measurement 40 may be made of ambient air or upstream throttle inlet air, which may be generally equal or may not be generally equal. The intake air temperature measurement is made of the air that will be provided through the throttle.

The measured airflow output 50, the vacuum measurement 38, the measured barometric pressure 40 and the measured intake air temperature 42 are provided to determine normalized throttle angle 54, which may use calculations similar to determine throttle angle 36. The normalized throttle angle 55 represents what the expected throttle angle would be for a nominal ETB to produce the measured airflow 50. The normalized throttle angle 55 and the throttle angle command output 44 are provided to calculate the difference in step 56. The difference is provided as throttle angle error to step 58 which determines if conditions are right for learning a throttle command compensation adder and calculates said adder. The calculation of the adder may include slowly learning the throttle angle error provided in step 56 via ramping or filtering. In another embodiment, the adder is a learned adder that is stored from previous calculations.

Figure 3:
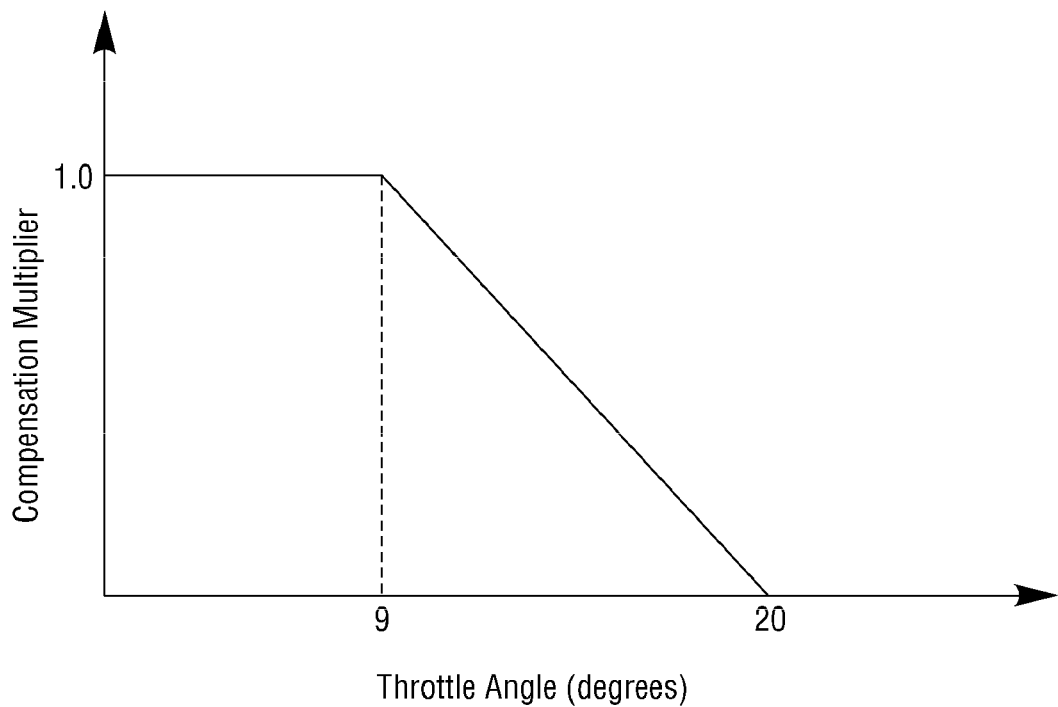
FIG. 3 is a graph illustrating a relationship between a throttle angle value and the effectiveness of the throttle adder.

A compensation multiplier may be provided in step 60 to modify the adder that is determined in step 58. In one embodiment, the compensation multiplier can be determined according to the relationship shown in FIG. 3, where the x-axis is the throttle angle in degrees and the y-axis is the effectiveness of the adder. When the throttle angle is between zero degrees and nine degrees, a compensation multiplier of one is provided, so that the full value of the adder, determined in step 58, is added to the throttle angle in step 66. When the throttle angle is between nine degrees and twenty degrees, the compensation multiplier may be scaled, as illustrated, so that less than the full adder is added to the throttle angle in step 66.

In step 66, the effective throttle command compensation adder may be determined utilizing inputs from the adder determined in step 58 and the compensation multiplier provided in step 60. In one non-limiting example, the compensation multiplier is equal to 0.75 and the adder is equal to 3. The compensated throttle angle command would be 2.25, which is the product of 0.75 multiplied by the adder of 3. In another non-limiting example, the multiplier is equal to 0.0 and the adder is equal to 2. The compensated throttle angle command would be 0.0, which is the product of 0.0 multiplied by the adder of 2.

The value of the compensation multiplier determined in step 60 may be provided to step 58 as one of the conditions necessary to enable learning a throttle command compensation adder.

The output of the error determined in step 58 and/or the compensation multiplier of step 60 may be provided as diagnostics outputs in step 62 so that the compensated error is provided when vehicle diagnostics are run.

The effective throttle command compensation adder calculated in step 66 is added to the throttle angle command output 44 to calculate a compensated throttle angle command output 68. The compensated throttle angle command output calculated in step 68 is provided to adjust the throttle angle of the ETB in step 70. ETB noise factors of step 72, such as sludge or any other noise factor, may alter the throttle angle to airflow relationship. The actual airflow through the ETB is determined in step 74. The measured airflow output 50 determined in step 74 is provided to determine the normalized throttle angle of step 54, as discussed above.

In at least one embodiment, steps 36-68 are provided within a powertrain control module 76 that is provided within the vehicle 10 of FIG. 1.

An output of the effective throttle command compensation adder of step 66 is provided in step 78. As illustrated in FIG. 2, the output provided in step 78 is employed to determine another embodiment of a throttle angle command. This throttle angle command can be used under certain conditions in step 70 in place of the compensated throttle angle command output from step 68. Such conditions could include an engine start mode where one may choose not to use the airflow command based compensation logic.

Figure 4:
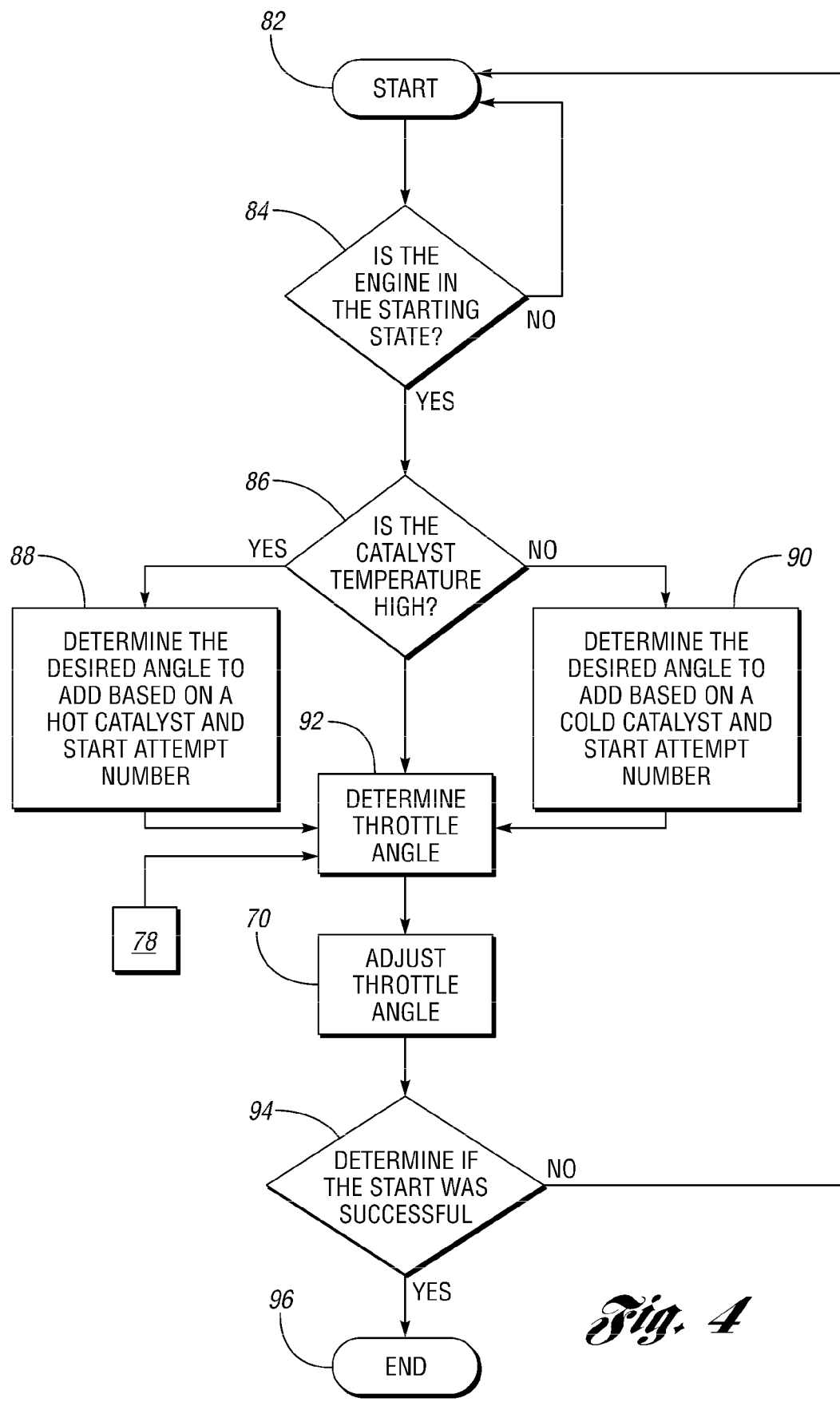
FIG. 4 is a flowchart illustrating a portion of yet another embodiment of the method for starting the vehicle engine of FIG. 2.

As described earlier, it is desirable to further adjust the throttle angle command during restart attempts should the engine fail to start at the initial request. FIG. 4 illustrates one method to determine the desired additional throttle compensation on restart. In step 82, the method begins. In step 84, it is determined whether the engine is in a starting state. If the engine is not in a starting state, then step 84 returns to step 82 to restart. If the engine is in a starting state, then step 84 moves on to step 86. In step 86, it is determined whether a catalyst temperature is high. If the catalyst temperature is high, step 86 moves on to step 88. If the catalyst temperature is not high, step 86 moves on to step 90. In step 88, a desired throttle angle compensation is determined based on a hot catalyst and start attempt number. When the catalyst is hot, the number of engine restarts before overheating the catalyst and permanently damaging the engine is minimized, so the throttle angle compensation should be increased. As the start attempt number increases, the throttle angle compensation should increase. In step 90, a desired throttle angle compensation is determined based on a cold catalyst and start attempt number. When the catalyst is cold, the throttle angle compensation should be increased as the start attempt number increases.

In step 92 the throttle angle compensation output 78 is added the calculation of step 88 or 90. The throttle angle calculated in step 92 is provided to step 70 to adjust the throttle angle to open to the throttle angle calculated in step 92. In step 94 it is determined if the start was successful.

Figure 5:
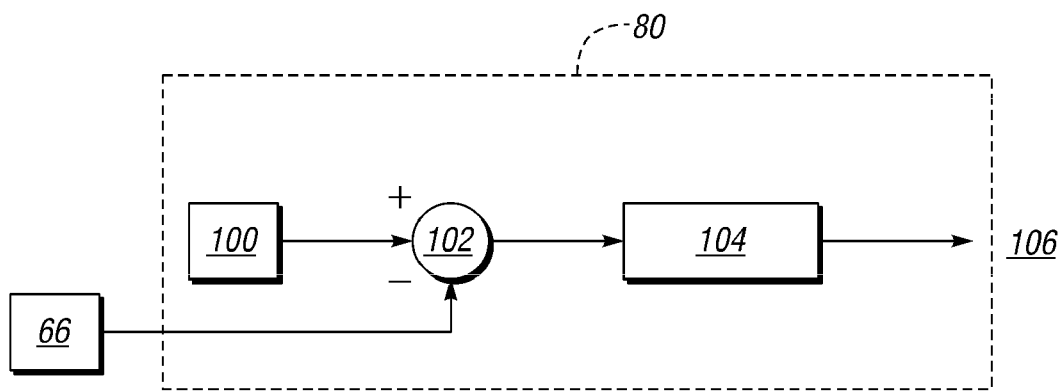
FIG. 5 is another flowchart illustrating another portion of an embodiment of the method for starting the vehicle engine of FIG. 2.

Referring back to FIG. 2, another output of the effective throttle command compensation adder of step 66 is provided in step 80. As further illustrated in FIG. 5, the output provided in step 66 is employed to determine a throttle position based load estimate. In step 100, the throttle angle of the ETB is measured and provided. In step 102, the output 66 is subtracted from the throttle angle calculated in step 100 to determine the effective actual throttle position. In step 104, the output of step 102 is implemented to determine a throttle angle based load estimate 106.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for starting a vehicle engine comprising:
   determining a throttle angle command output based on at least one of airflow command input, barometric pressure, accelerator pedal position and engine coolant temperature;
   determining an ignition attempt number by counting the number of vehicle engine start attempts before an ignition reset or successful engine start;
   adjusting the throttle angle command output based on the ignition attempt number such that a throttle angle is increased as the ignition attempt number increases;
   providing the throttle angle corresponding to the throttle angle command output;
   determining a catalyst temperature;
   further adjusting the throttle angle command output based on the catalyst temperature and the ignition attempt number;
   further adjusting the throttle angle command output based on an adder;
   calculating a new adder based on a previous airflow measurement; and
   storing the new adder as the adder.

2. A method for starting a vehicle engine comprising:
   determining a throttle angle command output based on at least one of airflow command input, barometric pressure, accelerator pedal position and engine coolant temperature;
   determining an ignition attempt number by counting the number of vehicle engine start attempts before an ignition reset or successful engine start;
   adjusting the throttle angle based on the ignition attempt number;
   providing a throttle angle corresponding to the throttle angle command output to start the vehicle engine;
   determining a catalyst temperature;
   further adjusting the throttle angle command output based on the catalyst temperature and the ignition attempt number;
   further adjusting the throttle angle command output based on a predetermined adder;
   calculating a calculated compensation factor based on a previous airflow measurement; and
   storing the calculated compensation factor as a learned compensation factor.

3. A method for starting a vehicle engine comprising:
   determining a throttle angle command output based on a throttle adjustment parameter;
   adjusting the throttle angle command output based on a compensation factor;
   providing a throttle angle corresponding to the throttle angle command output to start the vehicle engine; and
   storing the compensation factor as a learned compensation factor.

4. The method of claim 3 further comprising providing a predetermined compensation factor as the compensation factor.

5. A method for starting a vehicle engine comprising:
   determining a throttle angle command output based on a throttle adjustment parameter;
   adjusting the throttle angle command output based on a compensation factor;
   providing a throttle angle corresponding to the throttle angle command output to start the vehicle engine; and
   calculating the compensation factor based on a previous airflow measurement.

6. The method of claim 5 wherein the compensation factor is at least one of an adder and a multiplier.

7. The method of claim 5 further comprising adjusting the compensation factor based on a compensation multiplier.

8. The method of claim 1 wherein the throttle adjustment parameter is at least one of airflow command input, barometric pressure, accelerator position and intake air temperature.

9. The method of claim 1 further comprising providing an electric machine connected with the vehicle engine.

10. The method of claim 1 further comprising requesting an engine start at a non-zero vehicle speed.

11. The method of claim 5 further comprising storing the compensation factor as a learned compensation factor.

12. The method of claim 11 further comprising providing a predetermined compensation factor as the compensation factor.

13. The method of claim 1 further comprising determining an ignition attempt number by counting the number of vehicle engine start attempts before an ignition reset or successful engine start.

14. The method of claim 13 further comprising adjusting the compensation factor based on the ignition attempt number such that the throttle angle is modified as the ignition attempt number increases.

15. The method of claim 13 further comprising:
determining a catalyst temperature; and
further adjusting the throttle angle command output based on the catalyst temperature and the ignition attempt number.

16. A method for starting a vehicle engine comprising:
determining a throttle angle command output based on at least one of airflow command input, barometric pressure, accelerator pedal position and engine coolant temperature;
determining an ignition attempt number by counting the number of vehicle engine start attempts before an ignition reset or successful engine start;
adjusting the throttle angle based on the ignition attempt number; and
providing a throttle angle corresponding to the throttle angle command output to start the vehicle engine, wherein adjusting the throttle angle based on the ignition attempt number includes increasing the throttle angle command as the ignition attempt number increases.

17. The method of claim 16 further comprising:
determining a catalyst temperature; and
further adjusting the throttle angle command output based on the catalyst temperature and the ignition attempt number.

18. The method of claim 17 further comprising:
further adjusting the throttle angle command output based on a predetermined adder;
calculating a calculated compensation factor based on a previous airflow measurement; and
storing the calculated compensation factor as a learned compensation factor.

* * * * *